United States Patent Office 3,434,530
Patented Mar. 25, 1969

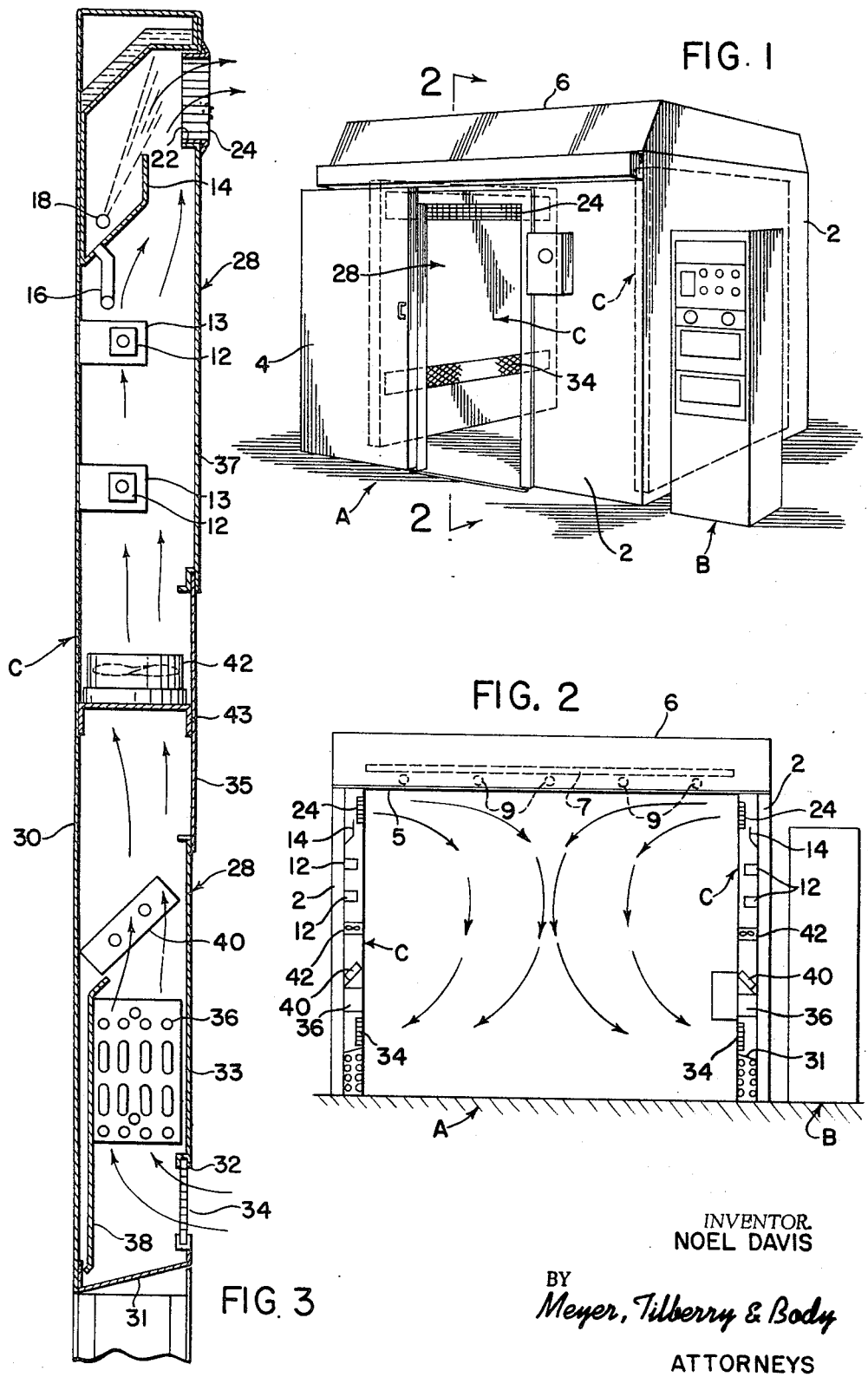

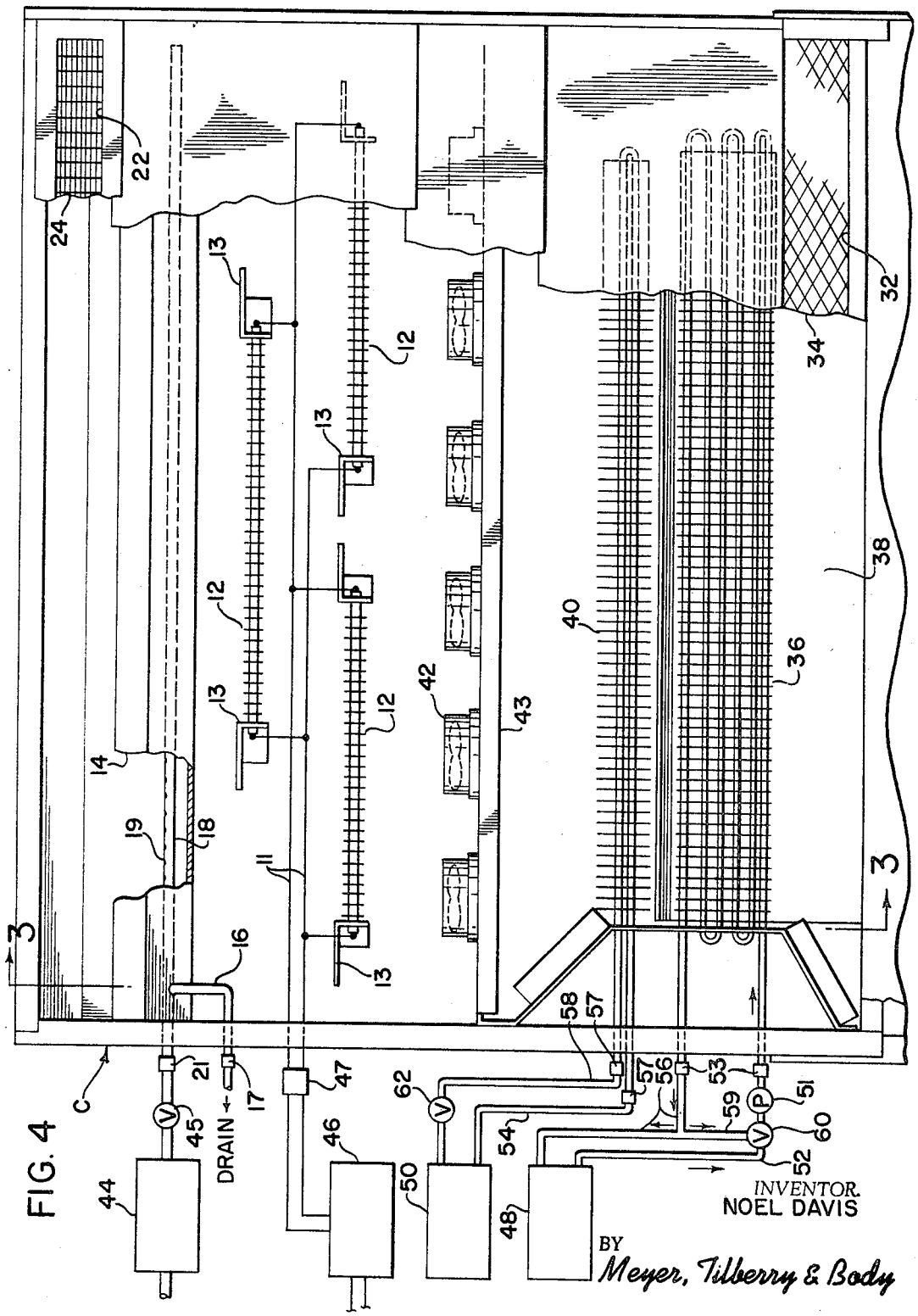

3,434,530
ENVIRONMENTAL GROWTH CHAMBER CONSTRUCTION
Noel Davis, Russell Township, Geauga County, Ohio, assignor to Integrated Development and Manufacturing Co., Chagrin Falls, Ohio, a corporation of Ohio
Filed Mar. 8, 1967, Ser. No. 621,493
Int. Cl. F24f 3/14; F28f 13/12
U.S. Cl. 165—60                                           4 Claims

ABSTRACT OF THE DISCLOSURE

The invention is directed to an environmental growth chamber adapted to provide controlled conditions of temperature, humidity and light for biological testing purposes. This chamber includes one or more modular self-contained housing units adapted to be readily placed in and removed from the chamber. Each of the modular units comprises an elongated, box-like structure having an air inlet and an air outlet and means for modifying the temperature and humidity of the air passing therethrough. These temperatures and humidity modifying means include a first cooling means located adjacent the air inlet and adapted to cool the air to a point above the dewpoint of the air. Also included is a second cooling means located downstream of the first cooling means and adapted to further cool the air to a point slightly below the final required dewpoint.

---

This invention pertains to the art of environment growth chambers and more particularly to an environment growth chamber having an improved modular arrangement of the temperature and humidity modifying devices associated therewith.

The invention is particularly applicable for use in conjunction with environmental growth chambers of the type used in biological research and will be described with particular reference thereto. However, it will be appreciated the invention has broader applications and may, for example, be used to provide closely controllable environmental conditions for the assembly of delicate machine mechanisms.

Environmental growth chambers are generally well insulated housing structures provided with means to maintain a closely controllable environment therein. These chambers are normally used in biological research. Experiments for such studies as photosynthesis, nutrition-tracer, metabolism, plant diseases, breeding and genetics, and environment variability are often carried out in such chambers. Since living things sense all the variables in their environment, the growth chamber must produce a synthetic, uniform, and controllable climate. It must be capable of closely controlling such variables as temperature, humidity, air flow, and light. In general, it must be capable of controlling temperature to any set point between 40 and 90° F. without varying more than 2° from this set point at any point within any transverse horizontal growing plane. Humidity must also be closely controlled. Normally, humidity conditions must be maintained within less than plus or minus 5% relative humidity of any desired relative humidity. Likewise, the velocity of air flow through these chambers must be closely controlled and should normally not exceed 100 feet per minute. Further, light conditions should be accurately controllable between approximately zero foot candles and at least 3000 foot candles.

In addition to closely maintaining the conditions set forth above, the environmental growth chamber must be highly dependable and easily maintained and serviced. This requirement is brought about by the nature of biological experimentation.

Biological experimentation generally requires that each test or experiment last for an extended period of time. For example, if a test were being conducted on the rate of growth of a particular plant under certain specified environmental conditions, it would probably be necessary to maintain the conditions for several weeks. If at some period during the test an element of the environment modifying and control apparatus were to fail or malfunction, it would be mandatory that repairs or adjustments be made in a minimum of time. Failure to make the necessary repairs in an extremely short period of time would result in the entire experiment being lost. This would be costly both in the loss of man-hours and experimental data.

The prior environmental growth chambers were comprised of a heavily insulated and well sealed chamber structure provided with insulated access openings or doors. Situated within the chamber were the various temperature, humidity and air flow modifying devices. These temperature, humidty and air flow modifying devices of the prior growth chambers were fixedly mounted on one or more interior walls of the chamber. These devices were then, normally, enclosed by a panel extending across the chamber parallel to the wall on which the devices were mounted, and spaced a short distance therefrom. This panel was provided with air inlet and outlet openings, and air was continuously circulated through the growth chamber and through the modifying devices located behind the panel.

This prior growth chamber construction made it necessary to install the various temperature and humidity modifying devices in the field. As a consequence, it was difficult to assure that the work was performed in accordance with factory requirements. Generally, the workers available for performing the installation work were not familiar with the equipment. Additionally, inspection of the work was usually not done adequately. As a result, the final installation often had undesirable air leaks, and in functioning and appearance did not come up to factory standards.

The present invention overcomes the above problems and provides a construction which permits the temperature and humidity modifying devices to be assembled as a unit at the factory. This assures that the devices are properly installed, as well as reducing the total cost of the chamber. Further, the present construction allows new equipment advances to be readily incorporated into the growth chamber at a minimum of cost and without reconstruction of the growth chamber. Additionally, the present arrangement acts to contain damages which could result from electrical fires in the temperature and humidity modifying devices, as well as containing the condensate drip from the cooling coils.

In accordance with the present invention, an environmental growth chamber is provided which has a modular self-contained unit adapted to be readily placed in and removed from the chamber. This unit includes the means for modifying the temperature of the air in the chamber as well as the means for controlling the humidity of the air and the means to produce a uniform flow of air through the chamber.

Further, in accordance with the present invention, a modular self-contained climate control unit is provided comprised of means defining a housing having an inlet and an outlet and an air passage connected between said inlet and outlet. In this housing are means to produce a flow of air through the passageway and first cooling means located in the passageway adapted to cool the air passing therethrough to a temperature above the dewpoint of the air. Also provided are second cooling means located downstream of the first cooling means and adapted to cool the air passing therethrough to a point below the dewpoint. Heating means are also positioned downstream of said second cooling means and means for adding moisture to the air after it has passed the heating means are provided.

Further, in accordance with a more limited aspect of the present invention an environmental growth chamber is provided which is adapted to provide controlled conditions of temperature, humidity and light for biological testing purposes. This chamber includes one or more modular self-contained housing units adapted to be readily placed in and removed from the chamber. Each of the modular units comprises an elongated, box-like structure having an air inlet and an air outlet and means for modifying the temperature and humidity of the air passing therethrough. These temperatures and humidity modifying means include a first cooling means located adjacent the air inlet and adapted to cool the air to a point above the dewpoint of the air. Also included is a second cooling means located downstream of the first cooling means and adapted to further cool the air to a point slightly below the final required dewpoint.

Further, in accordance with a still more limited aspect of the present invention an environmental growth chamber is provided which is adapted to provide controlled conditions of heat, light and humidity for biological testing purposes and wherein the chamber includes a source of light having an intensity of at least 3000 foot candles and means for producing a relatively uniform circulation of air through the chamber at a velocity not exceeding 100 feet per minute. Further means are provided for modifying the temperature of the air in the chamber and for removing and adding moisture to the air in the chamber. These devices are mounted in an elongated generally rectangular box-like structure adapted to be readily removed from the chamber. This box-like structure defines an air inlet at one end and an air outlet at the other end with an air passageway therebetween, thus providing a modular self-contained environment modifying unit which can be easily placed in or removed from the chamber.

The primary object of the present invention is to provide an environmental growth chamber construction which permits the temperature and humidity modifying devices to be factory assembled and placed in the chamber as a unit.

Another object is the provision of an environmental growth chamber with means which permit ready replacement of the temperature and humidity modifying devices in a minimum of time.

Yet another object is the provision of an environmental growth chamber which is capable of maintaining the exact temperature and humidity conditions required for conducting biological experiments while at the same time having sufficient design flexibility to permit ready adaptation of new equipment developments.

A further object is the provision of an environmental growth chamber which incorporates a high degree of flexibility at a minimum of cost.

A still further object is the provision of a growth chamber construction which provides for containment of damages resulting from electrical fire in the temperature and humidity control devices.

An additional object is the provision of an assembly which permits factory control of critical previously field assembled components.

These and other objects and advantages will become apparent from the following description used to illustrate the preferred embodiment of the invention as read in connection with the accompanying drawings in which:

FIGURE 1 is a pictorial view showing the overall interrelationship of the various parts of the environmental growth chamber;

FIGURE 2 is a cross-sectional elevation of the chamber taken on line 2—2 of FIGURE 1;

FIGURE 3 is a cross-sectional elevation of the modular temperature and humidity modifying unit of the present invention;

FIGURE 4 is a front elevation of the modular temperature and humidity modifying unit of the present invention, with a portion of the casing broken away to better show the various aspects of the unit.

Referring now to the drawings wherein the showings are for the purpose of illustrating a preferred embodiment of the invention only and not for the purpose of limiting same, FIGURE 1 shows the overall arrangement of the environmental growth chamber and its associated elements, comprised of main chamber housing A, control console B, and temperature and humidity modifying modules C.

The main chamber housing structure A comprises four vertically positioned walls 2, walk-in door 4, and light cap 6 extending over the top of the chamber. Walls 2 and door 4 are preferably well insulated to reduce the effects of temperature changes ambient to the growth chamber and are made, for example, of two sheets of polished aluminum bonded to a center core of polystyrene foam. Light cap 6 supplies the source of high intensity light necessary for conducting biological experiments. It comprises, in general, a substantially rectangular box structure adapted to be positioned with its downwardly open end in sealing relationship with walls 2. Mounted within light cap 6 are a plurality of closely spaced fluorescent lights 7 and incandescent lights 9. A piece of transparent sheet material 5, such as "plexiglass," extends across the downwardly open end of the light cap to reduce the amount of heat transferred to the chamber from the lights.

Positioned exteriorly of the chamber housing A is control console B. Control console B contains the recording and control equipment necessary to properly control and monitor the temperature and humidity modifying devices located within the growth chamber A. It should be noted that control console B forms no part of the present invention but is illustrated merely for the purpose of showing its overall relationship with the environmental growth chamber.

Positioned within the environmental growth chamber A and adjacent walls 2 are modules C which contain the necessary temperature and humidity modifying devices. Although two such modules are shown positioned on opposite walls, it is apparent that the number of modules required would depend on factors such as the size of the chamber and the conditions to be maintained. It is important, however, that each of the modules be of a size and construction that permits them to be readily removable from the growth chamber so that necessary maintenance and repairs can be made thereon, or so that new modules can be placed in the chamber.

Referring now to FIGURES 3 and 4 where the temperature and humidity modifying module C is illustrated in cross-sectional view, it is seen that the module is of generally rectangular shape and is constructed, for example, from sheet metal reinforced with sufficient structural members to make it an independent self-supporting structure, capable of standing in the main growth chamber with little or no support connections between it and the main growth chamber walls. In general, it is comprised of a vertically extending rear wall 30, a lower end wall 31, and a front wall 28. Front wall 28 is provided with a plurality of removable panel sections 33, 35, and 37 which permit inspection and repair of the various components of the assembly.

Positioned within the lower portion of the casing is an air inlet opening 32 having a grid member 34 positioned thereacross. Ths air inlet opening permits air to be withdrawn from the chamber and circulated through the casing.

Immediately above air inlet opening 32 and positioned in the path of air flow is sensible cooler 36. This cooler is comprised of several sinuously bent heat exchanger tubes covered with fins. Connected with cooler 36 by supply pipe 52 and return pipe 56, both of which have a disconnect coupling 53, is coolant supply device 48. Coolant supply device 48 could be any type of refrigerant unit or other device which would provide a source of coolant at a temperature normally above the dewpoint temperature of the air in the chamber. However, at high humidities the temperature may be below the dewpoint.

A pump or circulating device 51 is positioned in supply line 52 and serves to maintain a continuous flow of coolant through cooling coil 36. The temperature of the coolant supplied to the cooling coil is controlled by the use of a conventional three-way modulating valve 60. As shown, valve 60 receives coolant from both coolant supply 48 and by-pass line 59. By regulating the relative percentage of each, the temperature of coolant supplied to the coil is controlled. Valve 60 is controlled in response to signals from conventional control devices mounted in control console B.

As can be seen, the purpose of cooler 36 is to remove as much sensible heat as is necessary from the air passing through it without having the air come into contact with a surface below its dewpoint. Thus, by having cooler 36 of very large surface area and constantly circulating coolant through it at a temperature above the dewpoint of the air, it is possible to achieve temperature control without affecting the moisture content.

Immediately above cooler 36, and downstream thereof in the direction of air flow, is latent cooler 40. Cooler 40 is of substantially less heat exchange surface area than cooler 36 and is supplied with coolant at a temperature below the dewpoint temperature of the air in the chamber from coolant supply device 50 through supply line 54. Supply line 54 is provided with a disconnect coupling 57, as is return line 58. Flow of coolant through cooler 40 is controlled by valve 62 located in return line 58.

Because of the small heat exchange surface area of cooler 40 relative to the volume of air passing thereover, only a small portion of the air passing immediately adjacent the surfaces of the heat exchanger is cooled below the dewpoint. This permits a control of the moisture in the air with a minimum effect on the overall or average temperature of the air passing therethrough.

Thus, it can be seen that by the above-described arrangement of coolers 36 and 40 it is possible to relatively easily control the amount of moisture removed from the air without dropping the average temperature of the air below its dewpoint. Note that a substantial amount of the sensible heat in the air is removed by cooler 36, thus permitting cooler 40 to be relatively smaller and more closely control the removal of the latent heat and, consequently, the moisture rom the air.

Since cooler 40 condenses moisture from the air passing thereover, means are provided to remove the condensate from the growth chamber. For this reason, cooler 40 is inclined so that the condensate will flow toward the rear wall 30. A baffle 38 is provided to receive the condensate dripping from the cooler and direct it away from cooler 36 to the inclined bottom wall 31 of the casing. A drain line (not shown) is connected to the low point of the bottom wall and conducts the condensate exteriorly of the chamber.

Following cooler 40 are a plurality of fans 42 positioned at spaced locations horizontally across the chamber. By positioning the fans 42 at this location, the air coming from cooler 40 at stratified temperatures is thoroughly mixed. These fans are shown in the preferred embodiment as rotary axial flow fans, however, any fan or blower capable of producing the required flow of air through the unit could be used. Fans 42 are mounted from the wall 30 of the lower section of the casing by support 43. The capacity of these fans should be such that a continuous uniform flow of air through the environmental growth chamber is maintained at a velocity not to exceed approximately 100 feet per minute.

Immediately downstream of fans 42 in the direction of air flow there are a plurality of horizontal positioned electric heaters 12 mounted from the side wall 30 of the upper section of the casing by brackets 13. These heaters are supplied with electric current through wires 11 extending from controller 46 through a disconnect coupling 47. As shown, controller 46 is regulated by conventional temperature control equipment in response to signals from control console B. However, it would be possible to regulate the heaters manually by use of a rheostat or on-off switch or to use proportioning solid state devices. Although electrical heaters have been illustrated, it is apparent that other types of heaters such as radiant tube gas heaters or hot water coils could be used.

Following heating units 12 is a baffle member 14 positioned on the side wall 30 of the upper section of the casing. This baffle extends across the entire width of wall 30, as shown in FIGURE 4. As can be seen in FIGURE 3, the baffle extends outwardly from wall 30 in a generally upward direction thus directing the air flowing through the unit toward outlet 22.

Positioned immediately behind baffle 14 is steam pipe 18. Steam pipe 18 has a plurality of upwardly directed orifices 19 spaced therealong and adatped to direct steam from the pipe into the stream of air flowing therepast, thereby supplying the moisture necessary to properly humidify the air before it leaves the unit.

Steam is supplied to pipe 18 from steam source 44 which is connected to pipe 18 by a disconnect coupling 21. Steam source 44 could be any type of boiler or steam supply device capable of supplying an adequate quantity of steam. Flow of steam to the pipe is controlled by valve 45. Valve 45 could be manually operated, or operated by conventional automatic control equipment in response to signals from control console B.

Extending from the bottom of baffle member 14 to a location exterior of the unit where it is connected to a drain line by coupling 17 is drain pipe 16. This pipe serves to drain away any moisture which may happen to collect therein, preventing excess moisture from the steam pipe from flowing downwardly over the other condition modifying units and possibly damaging them.

Formed in the uppermost end of upper section of the casing is air outlet 22 with a diffusing grill 24 mounted therein. Diffusing grill 24 is designed to uniformly and evenly distribute the air leaving the modifying module throughout the environmental chamber.

Thus, it can be seen that an environmental growth chamber is provided that overcomes the prior art problems by mounting all of the temperature and humidity modifying devices in a self-contained modular unit which can be readily placed in or removed from the growth chamber. This gives the chamber a degree of flexibility and ease of maintenance not possible with prior art structures.

The invention has been described in great detail sufficient to enable one skilled in the art of environmental growth chambers to duplicate the invention. Obviously, modifications and alterations of the preferred embodiment described will occur to others upon a reading and understanding of this specification and it is my intention to include all such modifications and alterations as part of my invention insofar as they come within the scope of the appended claims.

Having thus described my invention, I claim:

1. In an environmental growth chamber adapted to provide controlled conditions of temperature, humidity and light for biological testing purposes, the improvement comprising: means defining a modular, self-contained housing unit adapted to be readily placed in or removed from said chamber and comprising an elongated box-like structure having an air inlet and an air outlet therein; fan means positioned in said structure for producing a continuous flow of air from said inlet to said outlet; means for controlling the temperature and humidity of the air leaving said outlet and including a first cooling coil means of relatively large surface area located adjacent the air inlet and having coolant flowing therethrough at a temperature sufficient to cool the air to a point above the dewpoint of said air, a second cooling coil means of substantially lesser surface area located downstream of said first cooling coil means and adapted to cool portions of said air to a point below the dewpoint of said air without lowering the average temperature of the air passing through said unit below said dewpoint, heating means positioned downstream of said fan means in said second cooling coil means and moisture adding means downstream of said heating means.

2. The improvement as defined in claim 1 wherein said moisture adding means comprises a steam injection means for injecting steam directly into said air.

3. The improvement as claimed in claim 1 wherein the said box-like structure is vertically elongated and the said air inlet and air outlet are at the lower and upper ends respectively.

4. The improvement of claim 1 wherein said fan means are positioned upstream of said heating means.

References Cited

UNITED STATES PATENTS

| | | | |
|---|---|---|---|
| 2,249,484 | 7/1941 | Miller et al. | 165—20 |
| 3,260,304 | 7/1966 | Rabechault | 165—19 |
| 3,263,737 | 8/1966 | Brummendorf | 165—60 |

ROBERT A. O'LEARY, *Primary Examiner.*

CHARLES SUKALO, *Assistant Examiner.*

U.S. Cl. X.R.

165—122